Patented May 26, 1942

2,283,920

UNITED STATES PATENT OFFICE 2,283,920

PRODUCTION OF ALIPHATIC ACIDS

Henry Dreyfus, London, and Walter Henry Groombridge, Spondon, near Derby, England, assignors to Celanese Corporation of America, a corporation of Delaware No Drawing. Application March 22, 1939, Serial No. 263,420. In Great Britain April 1, 1938

6 Claims. (Cl. 260—541)

This invention relates to the production of fatty acids from their salts.

In many industrial processes there are obtained solutions of metal salts of the lower fatty acids, especially of acetic acid. For example the waste liquor obtained after saponifying cellulose acetate textile materials may comprise sodium acetate or potassium acetate. It is an object of the present invention to obtain the free fatty acid from solutions of its salts.

According to the invention carbon dioxide is brought into contact with a solution of a metal salt of a fatty acid, so as to form the free acid, or an acid salt thereof from which the free acid may readily be obtained.

The reaction between carbon dioxide and sodium acetate, for example, results in the precipitation of sodium bicarbonate and the formation of acid sodium acetate. The solution so obtained may be freed from sodium bicarbonate, for example by decantation, filtration or centrifuging, preferably in the cold, and may then be treated to recover acetic acid from the acid acetate. Unchanged sodium acetate may be returned to the process. Potassium acetate may be treated similarly.

The solvent for the metal salt of the fatty acid should be chosen with reference to the particular metal and fatty acid contained in the salt, so that the salt, as well as the corresponding acid salt if such be produced, is more soluble in the solvent than is the bicarbonate of the metal.

For example, especially when acetates or other lower fatty acid salts of alkali metals are being treated, there may with advantage be used as solvent a lower aliphatic alcohol, for example methyl, isopropyl, or especially ethyl alcohol. Preferably a relatively concentrated alcohol is used. For example when using ethyl alcohol it is preferable to employ a concentration of at least 85% and preferably higher, e. g., 90–98%, especially about 94%. By employing high concentrations full advantage can be taken of the insolubility of the bicarbonates in alcohols.

The rate of reaction between the fatty acid salt and the carbon dioxide may be increased by employing the carbon dioxide in as high concentration as possible. Thus it is advisable always to have the solution saturated with the gas, and advantageously excess of the gas may be passed through the solution and recirculated.

The concentration of the carbon dioxide may also be increased to a valuable degree by working under a pressure higher, and preferably considerably higher, than atmospheric; preferably a pressure above 70 lbs./sq. inch is used, e. g. a pressure of 80, 100, 120 or 150 lbs./sq. inch. If desired still higher pressures, e. g., 200, 400 or 800 lbs./sq. inch may be used. The temperature employed may be atmospheric, but it is advisable to employ higher temperatures, for example 70°–130° C. One advantage of using such higher temperatures is that the bicarbonates are then precipitated in a form which is more readily removed by filtration.

The concentration of the metal acetate in the alcoholic solution is preferably as high as is conveniently possible. Especially when treating sodium acetate, which has a relatively low solubility in alcohol, it is preferred to employ substantially saturated solutions.

The process can be carried out as a batch process in one or more autoclaves, or it may be carried out continuously. For example, the solution may be passed downwards through a succession of substantially vertical towers or other vessels, up which a stream of carbon dioxide is passed, preferably under pressure as already indicated. If the solution is drawn off at a point near but not at the bottom of each tower a considerable part of the precipitated bicarbonate can be collected in the space between the drawoff and the bottom of the tower, this space thus forming a settling compartment for the precipitate. The settling compartment, which may with advantage be wider than the body of the tower, may be provided above and below with suitable valves or cocks, so that when a considerable amount of precipitate has collected this may be drawn off, together with the solution in the lower end of the tower. Such solution is preferably separated from the precipitate and returned to the process. The rest of the solution, after leaving the tower, is preferably first cooled, and may then be filtered or otherwise treated to remove any bicarbonate it may still contain.

When working under favorable conditions of alcohol concentration, temperature and pressure, it is possible to convert a high proportion of the sodium of potassium acetate contained in an alcoholic solution into the corresponding acid acetate. The free acid may be obtained from the acid acetate by heating. For example the solution of acid acetate may be heated under a fractionating column, whereby a high proportion of the alcohol may be recovered substantially or nearly free from acetic acid. The residue may then be heated more strongly to drive off the remainder of the loosely combined acetic acid, which is usually obtained in admixture with some alcohol and water, from which it may, if desired, be separated in any suitable way. The normal acetate remaining may be dissolved in fresh alcohol and returned to the process.

The metal bicarbonate produced can be used in any suitable way. Advantageously sodium or potassium bicarbonate may be heated to liberate carbon dioxide, preferably under the pressure employed in the process, and this carbon dioxide returned to the fatty acid salt solution. The carbonate remaining may if desired be converted into the corresponding hydroxide.

The invention is thus of particular interest in the saponification of cellulose acetate textile materials with caustic soda or potash, since it provides a simple and cheap cyclic process whereby substantially all the sodium or potassium base can be regenerated for re-use, and the acetic acid removed from the materials can be recovered. If desired sodium acetate may be converted into potassium acetate before the treatment, so as to make use of the greater solubility of potassium acetate in aqueous alcohol. For example, potassium chloride may be added to an alcoholic solution of sodium acetate, whereby sodium chloride is precipitated, leaving potassium acetate in the solution; the proportion of sodium precipitated as chloride may be increased by evaporating off alcohol, preferably until a saturated solution of potassium acetate remains.

In a valuable modification of the process, ammonia may be employed as well as the carbon dioxide. When this is done there is obtained an ammonium salt of the fatty acid, and the ammonium salt may be readily decomposed by heat to yield the free fatty acid and regenerate ammonia. For example, this may be done by the methods described in U. S. Patents Nos. 2,090,941 and 2,090,947. Since the method of U. S. Patent No. 2,090,947 depends on the presence of metal salts of the fatty acids, it is of particular value when not all of the metal salt has been decomposed by the carbon dioxide.

In working according to this modification the solution of the fatty acid salt, for example an aqueous solution, advantageously after concentration if it was originally very dilute, may be treated and preferably substantially saturated with ammonia, under the pressure to be employed in the carbon dioxide treatment, before coming into contact with the carbon dioxide; for instance when employing the type of plant described above, the solution may be saturated with ammonia before entering the towers and if desired, when two or more towers are used in series, more ammonia may be introduced between any or each pair of towers.

The following examples illustrate without in any way limiting the invention.

*Example 1*

A saturated solution of sodium acetate in 94% ethyl alcohol is heated to 100° C. in an autoclave under a carbon dioxide pressure of 215 lbs. per square inch. After about 2 hours the pressure is released; the solution is allowed to cool, and then separated by filtration from the precipitated sodium bicarbonate.

Nearly all the acetic acid contained in the solution is now in the form of acid sodium acetate. To obtain the acetic acid in the free state the solution is first concentrated by distilling off the greater part of the alcohol, and is then heated more strongly so as to decompose the acid salt, and the acid set free is distilled off. Usually the acetic acid is contaminated with alcohol and a little water, and it may if desired be purified in any known way.

*Example 2*

In the process described in Example 1, the solution in the autoclave is first saturated with ammonia under 200 lbs. per square inch pressure, and then subjected to the action of carbon dioxide under a partial pressure of 215 lbs. per square inch. Sodium bicarbonate is precipitated and filtered off as before, and a solution containing ammonium acetate remains.

To recover free acetic acid this solution is heated in a still provided with a fractionating column. As the temperature rises considerable quantities of ammonia come over, and may be collected, and increasing quantities of alcohol also distil over. The heating is continued until the temperature in the still reaches 140° C.; the recovery of the acetic acid is then completed as described in the example of U. S. Patent No. 2,090,941.

*Example 3*

A saturated solution of potassium acetate in 94% ethyl alcohol is caused to flow down a tower in counter-current to a stream of carbon dioxide. The tower is provided with bubble plates or other devices of the kind commonly used in the Solvay soda process for promoting intimate contact between the solution and the gas, and is capable of withstanding a relatively high internal pressure; at its lower end it is provided with a settling compartment for the greater part of the precipitate, the solution being continuously withdrawn from a level just above the settling compartment. By means of pipes set in the wall thereof the tower is kept at a temperature of 110° C., to which temperature also the solution is preheated under pressure before entering the tower. Inside the tower a carbon dioxide pressure of 200 lbs. per square inch is maintained.

After leaving the tower the solution is allowed to cool and is then filtered to separate such bicarbonate as has not been retained in the settling compartment. The output side of the filter is at atmospheric or lower pressure, and the solution is forced through the filter by the carbon dioxide pressure in the tower. The filtrate, consisting for the most part of an alcoholic solution of acid potassium acetate, is fractionated, whereby most of the alcohol is first recovered, and then about half the acetic acid contained in the acid salt. The normal potassium acetate remaining is redissolved in 94% ethyl alcohol and returned to the tower.

At intervals the mixture of solution and precipitated potassium bicarbonate in the settling compartment is run off; the bicarbonate is filtered off in the cold, and the solution either added to that leaving the tower above the settling compartment or returned directly to the tower.

In a modification of this process the original solution, heated to 80° C., is saturated with ammonia under 250 lbs. per square inch pressure before entering the tower. In this case the tower is kept at 80° C., and the carbon dioxide pressure is 250 lbs. per square inch. The solution leaving the tower is cooled, purified by filtration, and then treated to recover ammonia and acetic acid therefrom.

Although the invention has been described with particular reference to the treatment of alkali metal acetates, it may be applied to the treatment of salts of homologues of acetic acid as well as of fatty acids in which one or more hydrogen atoms are replaced by other atoms or groups. Moreover, salts of metals other than alkali metals may be treated. When treating calcium salts, for example, at temperatures of the order of 100° C., the bicarbonate first formed breaks down into the normal carbonate, setting free carbon dioxide for re-use. The calcium carbonate is readily separable from the solution by filtration.

In cases where a free acid is obtained rather than an acid salt, it may if desired be recovered from the solution by methods other than distillation, e. g., by extraction.

Having described our invention what we desire to secure by Letters Patent is:

1. Process for the manufacture of lower aliphatic acids from their salts, which comprises bringing carbon dioxide into contact with a solution of the salt in concentrated aqueous ethyl alcohol maintained at a temperature above 70° C. so as to form a corresponding acid salt, and treating the solution of the acid salt so obtained to obtain the free acid therefrom.

2. Process for the manufacture of acetic acid from its salts, which comprises bringing carbon dioxide into contact with a solution of the salt in concentrated aqueous ethyl alcohol maintained at a temperature above 70° C. so as to form a corresponding acid salt, and treating the solution of the acid salt so obtained to obtain the free acid therefrom.

3. Process for the manufacture of acetic acid from an alkali metal salt thereof, which comprises bringing carbon dioxide into contact with a solution of the salt in concentrated aqueous ethyl alcohol maintained at a temperature above 70° C. so as to form a corresponding acid salt, and treating the solution of the acid salt so obtained to obtain the free acid therefrom.

4. Process for the manufacture of acetic acid from alkali metal acetates which comprises bringing carbon dioxide under a partial pressure of above 70 lbs. per sq. inch into contact with a solution of the acetate in a concentrated aqueous alcohol, maintained at a temperature of between 70° and 130° C. during the treatment with carbon dioxide, so as to form the corresponding acid acetate and heating the acid acetate to liberate therefrom acetic acid.

5. Process for the manufacture of acetic acid from alkali metal acetates which comprises bringing carbon dioxide under a partial pressure of above 70 lbs. per sq. inch into contact with a solution of the acetate in aqueous ethyl alcohol of 90%–98% concentration, maintained at a temperature of between 70° and 130° C. during the treatment with carbon dioxide, so as to form the corresponding acid acetate and heating the acid acetate to liberate therefrom acetic acid.

6. Process for the manufacture of acetic acid from alkali metal acetates which comprises bringing carbon dioxide under a partial pressure of above 70 lbs. per sq. inch into contact with a solution of the acetate in aqueous ethyl alcohol of 90%–98% concentration, maintained at a temperature of between 70° and 130° C. during the treatment with carbon dioxide, so as to form the corresponding acid acetate, removing the bicarbonate formed, distilling alcohol from the solution and then increasing the temperature so as to recover acetic acid from the residue.

HENRY DREYFUS.
WALTER HENRY GROOMBRIDGE.